United States Patent
Nielsen et al.

(10) Patent No.: US 7,527,781 B2
(45) Date of Patent: May 5, 2009

(54) PROCESS FOR THE PREPARATION OF A HYDROGEN-RICH STREAM

(75) Inventors: Poul Erik Højlund Nielsen, Fredensborg (DK); John Bøgild Hansen, Copenhagen Ø (DK); Niels Christian Schiødt, Brønshøj (DK)

(73) Assignee: Haldor Topsoe A/S, Lyngby (DK)

( * ) Notice: Subject to any disclaimer, the term of this patent is extended or adjusted under 35 U.S.C. 154(b) by 553 days.

(21) Appl. No.: 10/548,802

(22) PCT Filed: Mar. 25, 2004

(86) PCT No.: PCT/EP2004/003159

§ 371 (c)(1),
(2), (4) Date: Sep. 13, 2005

(87) PCT Pub. No.: WO2004/087567

PCT Pub. Date: Oct. 14, 2004

(65) Prior Publication Data

US 2006/0165589 A1  Jul. 27, 2006

(30) Foreign Application Priority Data

Apr. 1, 2003 (DK) .................... 2003 00499

(51) Int. Cl.
*C01B 3/16* (2006.01)
*C01B 3/24* (2006.01)
*C01B 3/26* (2006.01)

(52) U.S. Cl. ............... 423/650; 423/651; 423/652; 423/655; 423/656

(58) Field of Classification Search ............... 423/655, 423/656, 650, 651, 652
See application file for complete search history.

(56) References Cited

U.S. PATENT DOCUMENTS

| | | | |
|---|---|---|---|
| 4,091,086 A * | 5/1978 | Hindin et al. | 423/648.1 |
| 5,221,524 A | 6/1993 | Eguchi | |
| 5,830,425 A * | 11/1998 | Schneider et al. | 423/437.2 |
| 5,990,040 A * | 11/1999 | Hu et al. | 502/342 |
| 6,238,640 B1 * | 5/2001 | Eguchi et al. | 423/437.2 |
| 6,500,403 B2 * | 12/2002 | Ward | 423/656 |
| 6,919,066 B2 * | 7/2005 | Holzle et al. | 423/648.1 |
| 6,926,880 B2 * | 8/2005 | Holzle et al. | 423/648.1 |
| 2001/0038816 A1 | 11/2001 | Keppeler | |
| 2002/0051747 A1* | 5/2002 | Suzuki et al. | 423/656 |

FOREIGN PATENT DOCUMENTS

| | | |
|---|---|---|
| EP | 1 213 779 | 6/2002 |
| JP | 59 203702 | 11/1984 |
| JP | 3 254071 | 11/1991 |

OTHER PUBLICATIONS

Choi Y, et al: "Kinetics of Methanol Decomposition and Water Gas Shift Reaction on a Commercial Cu-Zno/Al203 Catalyst", Preprints of Papers Presented- American Chemical Society, Division of Fuel Chemistry, Washington, DC, US, vol. I 47, No. 2, 2002, pp. 723-724.

* cited by examiner

*Primary Examiner*—Wayne Langel
(74) *Attorney, Agent, or Firm*—Dickstein Shapiro LLP

(57) ABSTRACT

A process for the preparation of a hydrogen-rich stream comprising contacting a carbon monoxide-containing gas, methanol and water in at least one shift step in the presence of a catalyst comprising copper, zinc and aluminium and/or chromium at a shift inlet temperature of at least 280° C. and a pressure of at least 2.0 MPa.

8 Claims, 1 Drawing Sheet

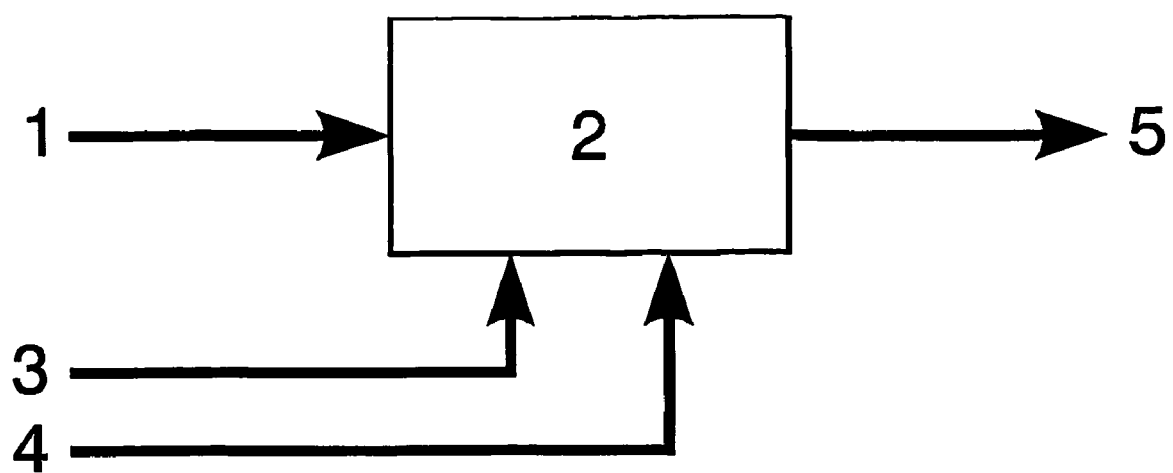
Figure

PROCESS FOR THE PREPARATION OF A HYDROGEN-RICH STREAM

The invention relates to a process for the preparation of a hydrogen-rich stream and provides a facile process for boosting capacity of fuel-based hydrogen plants.

Hydrogen plants can utilise fuels such as natural gas, liquid hydrocarbons or solid fuels like coal or biomass. In these plants, hydrogen production takes place in four consecutive procedures—feed purification followed by steam reforming (or gasification), water gas shift (WGS) and purification. These procedures are further described in Kirk-Othmer and Ullman.

The WGS reaction is described in the following equation:

$$CO + H_2O \rightarrow CO_2 + H_2 \quad (1)$$

It is a slightly exothermic reaction used for producing more hydrogen. Known WGS catalysts in industrial high temperature shift (HTS) applications are high-temperature catalysts that are chromium-supported and iron-based, and they are sometimes promoted with copper. The operational range for the HTS is typically 340-360° C. inlet temperature and with exit temperatures that are approximately 100° C. higher. The operational range of the inlet temperature for low temperature shift (LTS) catalysts is from 200° C. (or 20° C. above the dew point of the gas). The inlet temperature should be kept as low as possible Further details on catalysts for shift reactions and operating temperature are given in Catalyst Handbook, 2. Ed. Manson Publishing Ltd. England 1996.

In addition to these catalysts, Haldor Topsøe A/S has marketed a medium-temperature shift catalyst that is Cu-based and capable of operating at temperatures up to 310° C. Various vendors offer sulphur-tolerant catalysts for the gasification-based plants. However, these plants are not widely used for hydrogen production.

Methanol is produced on a large scale of more than 30 MM t/y. Basically, methanol is produced in very large plants with capacities of more than 2000 MTPD at places where natural gas is cheap. The production cost for methanol at places with cheap natural gas is estimated to be in the order of 60-80 USD/MT.

In the future, it is expected that methanol can be available in large quantities and to a price that on an energy basis might be significantly lower than the oil price.

In recent years there have been numerous studies of steam reforming of methanol for producing hydrogen and in particular hydrogen for fuel cells. The disadvantage of the steam reforming process is that the heat of reaction has to be supplied through a wall and the equipment as such becomes cumbersome.

Catalysts for low temperature steam reforming of methanol are copper based or optionally based upon noble metals. Some companies, for instance Haldor Topsøe A/S, offer commercial products.

U.S. Pat. No. 5,221,524 describes a hydrogen production process where a reformed gas is cooled before undergoing a low temperature shift reaction catalysed by a copper catalyst with an inlet temperature of 205° C. Liquid methanol is dispersively supplied to the shift converter and unconverted methanol is recycled to the methanol supply source and the shift reactor. The catalyst has activity both for low temperature shift conversion of carbon monoxide and the steam reforming reaction of methanol to hydrogen and carbon dioxide. The heat generated from the shift conversion reaction is utilised to accelerate the endothermic reaction for methanol decomposition.

U.S. Patent Application No. 2001/0038816 describes a gas generator for generating hydrogen utilising a shift reactor supplied with a reformed gas and water containing small amounts of methanol for frost protection. The gas generator is connected to a fuel cell set-up.

JP Patent Application No. 59203702 describes a hydrogen manufacturing process whereby methanol and steam are reacted in a shift reactor and the effluent gas is purified and hydrogen is removed. The remaining gases are combusted and the heat generated is used as a heat source for the methanol decomposition in the shift reactor.

JP Patent Application No. 3254071 describes a process for modifying alcohol and generating hydrogen for a fuel cell. Natural gas is reacted with air in a methanol modifier, and the heat generated is used for conversion of the methanol/water mixture.

It is an objective of the invention to provide a process for production of hydrogen by utilising a catalyst capable of operating at a wide range of temperatures.

According to the invention, there is provided a process for the preparation of a hydrogen-rich stream comprising contacting a carbon monoxide-containing gas, methanol and water in at least one shift step in the presence of a catalyst comprising copper, zinc and aluminium and/or chromium.

The process can be carried out by adding methanol to the feed stream to a water gas shift reactor containing a Cu-based catalyst comprising zinc, aluminium and/or chromium and resulting in a catalytic decomposition of the methanol along with the water gas shift reaction. In the isothermal case, the heat released by the exothermic Water Gas Shift Reaction balances the heat used for the endothermic steam reforming of methanol. The sensible heat in the feed streams may further be used in the process whereby a significant larger amount of methanol may be steam reformed.

The catalyst used in the process of the invention is capable of operating both at lower temperatures and at temperatures above 350° C.

By using this catalyst in the process the hydrogen production from the unit may be boosted up to 100%. Alternatively, the process can be used to decrease the load on the reforming section. A capacity increase of ammonia plants is also provided by applying the process of the invention in such a plant.

The endothermic methanol steam reforming reaction:

$$CH_3OH + H_2O \rightarrow 3H_2 + CO_2 \quad (2)$$

obtains the necessary heat of reaction from the sensible heat in the gas as well as from the latent heat from the WGS reaction. The catalyst utilised in the process of the invention tolerates the maximum inlet temperature and is still active at a much lower temperature primarily determined by the desire to keep the outlet methanol concentration as low as possible (typically in the temperature range from 240-320° C.).

Experiments with addition of methanol to iron-based shift catalyst have shown that a significant amount of methane formation takes place on these catalysts. This is also the result of the large scale production of town gas using the Hytanol process developed by Lurgi.

The invention is applicable to a hydrogen plant on any scale. In addition the invention proves to be particularly useful for peak shaving purposes in gasification based combined cycle power plant or in fuel processors, e.g. by injecting a (liquid) methanol water mixture after the autothermal reformer.

The FIGURE illustrates the process of the invention. Synthesis gas 1 is injected into a shift section 2. A stream of methanol 3 and water 4 are also injected into the shift section 2 where the shift step occurs. The methanol stream 3 can be added either in liquid form or in vapour form. The water 4 can be added as vapour. The shift section contains catalyst having activity both for the shift conversion reaction of the carbon monoxide and the steam reforming reaction of methanol. The heat required for the endothermic steam reforming reaction of methanol is provided by the heat obtained in the shift conversion reaction. The product is a hydrogen-rich stream 5.

The catalysts suitable for the process contains copper, zinc, aluminium and/or chromium. Using this catalyst results in an increase in capacity and the catalyst is active at both lower temperatures and at temperatures above 350° C.

Addition of methanol and water in vapour form has the advantage that complicated dispersive elements required to distribute liquid methanol in the shift section are avoided. An additional benefit is the high reactant partial pressure created throughout the shift section. Methanol can be added as a single stream, which is an advantage.

The shift section can comprise a single shift step or a combination of shift steps. An embodiment of the invention comprises a process where at least one shift step is a medium-temperature or a high temperature shift step. Another embodiment of the invention comprises a process where the medium or high temperature shift step is followed by a low temperature shift step. Other combinations of shift steps are also possible and are encompassed by the process of the invention.

The synthesis gas stream 1 can be obtained from various sources for example a steam reformed gas, a secondary reformer, an autothermal reformer or an upstream pre-reformer.

A particular embodiment of the invention comprises the process where a hydrocarbon stream and steam are first pre-reformed to obtain methane and then steam reformed to obtain a gas containing carbon monoxide, before entering the shift step. After the shift reaction the hydrogen produced is separated and unconverted methanol is recycled to the pre-reformer.

Besides methanol, other similar species like methyl formate, formaldehyde or formic acid may be used.

The advantages of the process of the invention are illustrated in the following examples.

EXAMPLES

The following catalysts from Haldor Topsøe A/S have been used in the examples:

Catalyst A: SK201-2—a high-temperature shift catalyst comprising oxides of copper, iron and chromium.
Catalyst B: MK101—methanol synthesis catalysts comprising oxides of copper, zinc and aluminium.
Catalyst C: MK121—methanol synthesis catalysts comprising oxides of copper, zinc and aluminium.

Example 1 is a comparative example, which serves to demonstrate that catalysts such as catalyst A are not suited for the production of hydrogen from methanol cracking. Examples 2-13 serve to demonstrate the scope of the present invention using copper-based catalysts. In these examples, it is demonstrated how hydrogen production, according to the process of the invention, may be improved significantly and with extremely high efficiency. Examples 14-18 are comparative examples demonstrating the performance of the catalysts under normal water gas shift conditions. Catalyst C is used in these examples.

Example 1

Comparative 10 g of catalyst A is activated by means of steam and a dry gas containing 15% CO, 10% $CO_2$ and 75% $H_2$. It is further tested at 380° C. at a dry gas flow of 50 Nl/h and a steam flow of 45 Nl/h at a pressure of 2.3 Mpa. After 70 hours the CO concentration in the dry exit gas is 3.7%. Further addition of 0.5 Nl/h of methanol causes the CO exit concentration to increase to 4.0% and the exit $CH_4$ concentration to increase from 20 ppm to 1000 ppm. Furthermore, the water condensed after the reactor contained a significant amount of unconverted methanol corresponding to approximately 50% of the methanol added. When the methanol was removed the $CH_4$ formation decreased to 25 ppm and the CO formation to 3.9%.

The result clearly shows that this catalyst is unsuitable for catalytic methanol decomposition into hydrogen and carbon oxides.

Example 2

15.2 g of catalyst B is reduced in diluted hydrogen (1-5 vol %) at 185° C. at a pressure of 0.1 MPa, and the synthesis gas being comprised of 43.1% hydrogen, 14.3% carbon monoxide, 11.1% carbon dioxide and 31.5% nitrogen is introduced. The pressure is increased to 2.5 MPa and the temperature is raised to 235° C. A solution of 19.63% wt/wt methanol in water is evaporated and co-fed with the synthesis gas. The dry gas flow is 100 Nl/h, whereas the liquid flow is 41.6 g/h corresponding to a steam flow of 41.6 Nl/h and a methanol flow of 5.7 Nl/h. The exit gas is analysed after condensation of residual steam and methanol. At these conditions the CO exit concentration amounts to 0.90% and the $CO_2$ exit concentration is 21.7% and the dry flow gas flow is increased to 130 Nl/h. No $CH_4$ is observed at any time the detection limit being approximately 1 ppm.

At these conditions, the exit temperature is measured to be 242° C. immediately after the catalyst bed and the liquid flow exit in the reactor is 20.8 g/h with a methanol concentration of 8.14% wt/wt. The methanol exit flow is thus 1.18 Nl/h. This corresponds to a methanol conversion C(M):

$$C(M) = (\text{methanol flow}_{inlet} - \text{methanol flow}_{exit})/\text{methanol flow}_{exit})/\text{methanol flow inlet} * 100\% = 79.3\%.$$

The carbon monoxide conversion is calculated as C(CO):

$$C(CO) = (\text{CO flow}_{inlet} - \text{CO flow}_{exit})/\text{CO flow inlet} * 100\% = 91.8\%.$$

The productivity of hydrogen is calculated as Prod(H2):

$$\text{Prod}(H2) = (\text{hydrogen flow}_{exit} - \text{hydrogen flow}_{inlet})/\text{mass of catalyst} = 1700 \text{ Nl H2/kg/h}.$$

Carbon mass balance, C(in)/C(ex), is found to be 1.02. The results are summarized in Table 1.

Examples 3-7

As Example 2 except for variations in temperature, dry gas flow and liquid flow as according to Table 1. The catalyst is the same batch as used in Example 2. Analysis of the condensable part of the exit gas of Example 7 reveals a concentration of ethanol of 10 ppm wt/wt. No higher alcohols, methane or any other hydrocarbons are observed in any of Examples 3-7. The selectivity of methanol conversion to carbon oxides and hydrogen is thus 100% within the accuracy of the experiments.

Example 8

15.1 g of catalyst C is reduced in dry diluted hydrogen (1-5 vol %) at 185° C. at a pressure of 0.1 MPa and the synthesis gas being comprised of 43.1% hydrogen, 14.3% carbon monoxide, 11.1% carbon dioxide and 31.5% nitrogen is introduced. The pressure is increased to 2.5 MPa and the temperature is raised to 216° C. A solution of 22.37% wt/wt methanol in water is evaporated and co-fed with the synthesis gas. The dry gas flow is 50 Nl/h, whereas the liquid flow is 16.0 g/h corresponding to a steam flow of 15.5 Nl/h and a methanol flow of 2.5 Nl/h. The exit gas is analysed after condensation of residual steam and methanol. At these conditions the CO exit concentration amounts to 0.64% and the $CO_2$ exit concentration is 22.3% and the dry flow gas flow is increased to 63 Nl/h. No $CH_4$ is observed at any time, the detection limit being approximately 1 ppm. At these conditions, the exit temperature is measured to be 219° C. immediately after the catalyst bed and the liquid flow exit the reactor is 18.7 g/h with a methanol concentration of 11.26% wt/wt. The methanol exit flow is thus 1.47 Nl/h.

The conversions are calculated as above with C(M)=56.9% and C(CO)=94.3%. The productivity of hydrogen is Prod (H2)=749 Nl H2/g/h. Carbon mass balance is found to be 1.00. The results of methanol-boosted shift over catalyst C are summarized in Table 2.

Example 9

This experiment is similar to Example 8 except for variation in dry gas flow and liquid flow as shown in Table 2. The selectivity of methanol conversion to carbon oxides and hydrogen is 100%.

Example 10

The catalyst used in Examples 8-9 is left on stream for 120 hours at an inlet temperature of 313° C., a dry gas flow of 100 Nl/h, a liquid flow of 60 g/h, a pressure of 2.5 MPa and with feed compositions as in Examples 8-9. The selectivity of methanol conversion to carbon oxides and hydrogen is 100%. The exit concentration of carbon monoxide is constant at 1.25±0.05% in this period. After the 120 hours period the condensate was analysed again with the results given in Table 2.

Examples 11-13

These experiments are similar to Example 10 except for variations in temperature, dry gas flow and liquid flow as shown in Table 2.

Examples 14-17

Comparative

These experiments are similar to Examples 10-13 except that methanol is excluded from the liquid feed. The results catalyst C without methanol addition are shown in Table 3.

TABLE 1

| | Example | | | | | |
|---|---|---|---|---|---|---|
| | 2 | 3 | 4 | 5 | 6 | 7 |
| inlet Temp (° C.) | 235 | 235 | 273 | 273 | 311 | 312 |
| exit Temp (° C.) | 242 | 237 | 275 | 275 | 312 | 309 |
| Inlet dry flow (Nl/h) | 100 | 50 | 100 | 50 | 100 | 100 |
| inlet liquid flow (g/h) | 41.6 | 18.8 | 41.7 | 17.8 | 41.5 | 60.0 |
| inlet steam flow (Nl/h) | 42 | 19 | 42 | 18 | 42 | 60 |
| inlet MeOH flow (Nl/h) | 5.7 | 2.6 | 5.7 | 2.4 | 5.7 | 8.2 |
| exit dry flow (Nl/h) | 130 | 66 | 137 | 67 | 137 | 148 |
| exit liquid flow (g/h) | 20.8 | 7.9 | 19.5 | 9.4 | 17.0 | 27.6 |
| $[MeOH]_{exit}$ (% wt/wt) | 8.14 | 8.26 | 3.58 | 2.03 | 1.03 | 1.27 |
| $[CO]_{exit}$ (mole %) | 0.90 | 0.66 | 1.20 | 1.30 | 1.79 | 1.20 |
| C(M) (%) | 79.3 | 82.3 | 91.5 | 94.6 | 97.8 | 97.0 |
| C(CO) (%) | 91.8 | 93.8 | 88.4 | 87.7 | 82.7 | 87.5 |
| Prod($H_2$) (Nl/kg/h) | 1700 | 940 | 2080 | 970 | 2090 | 2640 |
| $C_{(in)}/C_{(ex)}$ | 1.02 | 0.99 | 0.98 | 0.98 | 0.98 | 0.98 |

TABLE 2

| | Example | | | | | |
|---|---|---|---|---|---|---|
| | 8 | 9 | 10 | 11 | 12 | 13 |
| Inlet Temp (° C.) | 216 | 216 | 313 | 313 | 275 | 236 |
| Exit Temp. (° C.) | 219 | 224 | 310 | 314 | 279 | 244 |
| Inlet dry flow (Nl/h) | 50 | 100 | 100 | 100 | 100 | 100 |
| Inlet liquid flow (g/h) | 18.7 | 60 | 60 | 41.9 | 39.8 | 41.7 |
| Inlet steam flow (Nl/h) | 18 | 58 | 58 | 40 | 38 | 40 |
| Inlet MeOH flow (Nl/h) | 2.9 | 9.4 | 9.4 | 6.6 | 6.2 | 6.5 |
| Exit dry flow (Nl/h) | 63 | 131 | 148 | 139 | 139 | 134 |
| Exit liquid flow (g/h) | 16.0 | 39.6 | 31.9 | 20.3 | 19.3 | 21.4 |
| $[MeOH]_{exit}$ (% wt/w) | 11.26 | 14.77 | 1.52 | 1.29 | 3.45 | 10.87 |
| $[CO]_{exit}$ (mole %) | 0.64 | 0.95 | 1.23 | 1.86 | 1.34 | 1.11 |
| C(M) (%) | 56.9 | 56.4 | 96.4 | 97.2 | 92.5 | 75.1 |
| C(CO) (%) | 94.3 | 91.2 | 87.2 | 81.8 | 86.9 | 89.5 |
| Prod(H2) (Nl/kg/h) | 750 | 1700 | 2550 | 2140 | 2180 | 1920 |
| $C_{(in)}/C_{(ex)}$ | 1.00 | 1.03 | 1.04 | 1.02 | 1.01 | 1.03 |

TABLE 3

| | Example No. | | | |
|---|---|---|---|---|
| | 14 | 15 | 16 | 17 |
| Inlet Temp. (° C.) | 236 | 274 | 312 | 313 |
| Exit Temp. (° C.) | 253 | 289 | 325 | 327 |

TABLE 3-continued

| | Example No. | | | |
|---|---|---|---|---|
| | 14 | 15 | 16 | 17 |
| Inlet dry flow (Nl/h) | 100 | 100 | 100 | 100 |
| Inlet liquid flow (g/h) | 31.8 | 31.8 | 31.8 | 46.2 |
| Inlet steam flow (Nl/h) | 40 | 40 | 40 | 57 |
| Inlet MeOH flow (Nl/h) | 0 | 0 | 0 | 0 |
| Exit dry flow (Nl/h) | 116 | 116 | 115 | 116 |
| Exit liquid flow (Nl/h) | — | — | — | — |
| [MeOH] exit (% wt/wt) | — | — | — | — |
| [CO] exit (mole %) | 0.88 | 1.13 | 1.62 | 1.15 |
| C(M) (%) | — | — | — | — |
| C(CO) (%) | 92.9 | 90.8 | 87.0 | 90.8 |
| Prod (H2) (Nl/kg/h) | 1060 | 1040 | 1000 | 1040 |
| C(in)/C(ex) | 1.03 | 1.03 | 1.03 | 1.03 |

The above examples clearly demonstrate that hydrogen production may be significantly improved by addition of methanol to a synthesis gas and exposing the resulting mixture to a catalyst containing copper. Thus, when 15 g of the catalyst MK121 is exposed to synthesis gas at an inlet temperature of 313° C. at a dry gas flow of 100 Nl/h, a steam flow of 57 Nl/h and 25 bar pressure, the hydrogen production amounts to 1040 Nl/kg/h (Example 17). In this example the exit temperature is 327° C. and the CO concentration is 1.15%. With the same catalyst, addition of 9.4 Nl/h methanol to the feed but otherwise the same conditions of operation, the hydrogen productivity increases to 2550 Nl/kg/h (Example 10). In this example the exit temperature is 310° C. and the CO concentration is 1.23%.

The invention claimed is:

1. A process for the preparation of a hydrogen-rich stream comprising reforming a hydrocarbon feed to obtain a carbon monoxide-containing gas, and contacting the carbon monoxide-containing gas, methanol and water in at least one shift step without external addition of heat in the presence of a catalyst comprising copper, zinc and aluminum and/or chromium, at a shift inlet temperature of at least 280° C. and a pressure of at least 2.0 MPa.

2. A process according to claim 1, wherein the methanol and water are in vapour form.

3. A process according to claim 1, wherein the methanol and water are in liquid form.

4. A process according to claim 1, wherein the at least one shift step is a Medium Temperature or High Temperature shift step.

5. A process according to claim 4, wherein the Medium Temperature or High Temperature shift step is followed by a Low Temperature shift step.

6. Process according to claim 1, wherein the hydrocarbon feed is pre-reformed before the reforming step.

7. Process according to claim 6, wherein unreacted methanol is separated from the shift step effluent and re-cycled to the pre-reforming step.

8. Process according to claim 4, wherein the shift inlet temperature is at least 300° C.

* * * * *